United States Patent
Kim et al.

(10) Patent No.: US 10,214,439 B2
(45) Date of Patent: Feb. 26, 2019

(54) NON-CONTACT VIBRATION SUPPRESSION DEVICE AND OBJECT PROCESSING METHOD

(71) Applicant: Corning Precision Materials Co., Ltd., Chungcheongnam-do (KR)

(72) Inventors: Shin Kim, Chungcheongnam-do (KR); Ki Nam Kim, Chungcheongnam-do (KR); Mun Hwan Seol, Chungcheongnam-do (KR); Dong Young Cho, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 179 days.

(21) Appl. No.: 15/033,988

(22) PCT Filed: Nov. 4, 2014

(86) PCT No.: PCT/KR2014/010481
§ 371 (c)(1),
(2) Date: May 3, 2016

(87) PCT Pub. No.: WO2015/065147
PCT Pub. Date: May 7, 2015

(65) Prior Publication Data
US 2016/0304382 A1    Oct. 20, 2016

(30) Foreign Application Priority Data
Nov. 4, 2013  (KR) ........................ 10-2013-0133103

(51) Int. Cl.
*C03B 23/00*    (2006.01)
*B65H 23/188*   (2006.01)
(Continued)

(52) U.S. Cl.
CPC ................ *C03B 23/00* (2013.01); *B24B 7/24* (2013.01); *B24B 41/06* (2013.01); *B26D 7/086* (2013.01);
(Continued)

(58) Field of Classification Search
CPC ............ C03B 23/00; B24B 7/24; B24B 41/06
See application file for complete search history.

(56) References Cited

U.S. PATENT DOCUMENTS

2011/0198378 A1* 8/2011 Chang .................. B65G 49/063
226/7
2011/0311320 A1* 12/2011 Schilp .................... B65G 54/00
406/86

FOREIGN PATENT DOCUMENTS

JP    2011200843 A    10/2011
JP    2012187453 A    10/2012
(Continued)

OTHER PUBLICATIONS

International Search Report for Application No. PCT/KR2014/010481 dated Mar. 2, 2015.

*Primary Examiner* — Jacob T Minskey
*Assistant Examiner* — Melody Tsui
(74) *Attorney, Agent, or Firm* — Lerner, David, Littenberg, Krumholz & Mentlik, LLP

(57) ABSTRACT

The present invention provides a non-contact vibration suppression device comprising a first ultrasonic vibration unit and a second ultrasonic vibration unit, the device being characterized in that the first ultrasonic vibration unit and the second ultrasonic vibration unit are installed to face each other while being spaced from each other such that an object can be interposed therebetween, the first ultrasonic vibration unit and the second ultrasonic vibration unit generate ultrasonic vibrations, respectively, and apply repulsive forces, which result from the ultrasonic vibrations, to the object (Continued)

such that the object is constrained with no contact between the first ultrasonic vibration unit and the second ultrasonic vibration unit, thereby suppressing vibration of the object. In addition, the present invention provides an object processing method characterized by comprising the steps of: suppressing vibration of the object using the non-contact vibration suppression device; and processing the object, vibration of which has been suppressed.

11 Claims, 8 Drawing Sheets

(51) Int. Cl.
    *B65H 29/52*     (2006.01)
    *C03B 33/023*     (2006.01)
    *B26D 7/08*     (2006.01)
    *B26D 7/22*     (2006.01)
    *B24B 7/24*     (2006.01)
    *B24B 41/06*     (2012.01)
    *B65H 5/00*     (2006.01)
    *C03C 17/00*     (2006.01)
    *B65H 5/38*     (2006.01)
    *B65G 49/06*     (2006.01)
    *C03B 35/24*     (2006.01)

(52) U.S. Cl.
    CPC .............. *B26D 7/22* (2013.01); *B65G 49/065* (2013.01); *B65G 49/066* (2013.01); *B65H 5/008* (2013.01); *B65H 5/38* (2013.01); *B65H 23/188* (2013.01); *B65H 29/52* (2013.01); *C03B 33/0235* (2013.01); *C03B 35/246* (2013.01); *C03C 17/001* (2013.01); *B65H 2404/611* (2013.01); *B65H 2515/50* (2013.01); *B65H 2601/125* (2013.01); *B65H 2601/51* (2013.01); *B65H 2801/61* (2013.01); *B65H 2801/87* (2013.01)

(56) References Cited

FOREIGN PATENT DOCUMENTS

| | | |
|---|---|---|
| KR | 20030053390 A | 6/2003 |
| KR | 20060100917 A | 9/2006 |
| KR | 20080016518 A | 2/2008 |
| KR | 20100057530 A | 5/2010 |
| KR | 20110095191 A | 8/2011 |

* cited by examiner

NON-CONTACT VIBRATION SUPPRESSION DEVICE AND OBJECT PROCESSING METHOD

CROSS-REFERENCE TO RELATED APPLICATION

This application is a national phase entry under 35 U.S.C. § 371 of International Application No. PCT/KR2014/010481, filed Nov. 4, 2014, published in Korean, which claims priority to Korean Patent Application No. 10-2013-0133103, filed on Nov. 4, 2013, the disclosures of which are incorporated herein by reference.

BACKGROUND OF THE INVENTION

Field of the Invention

The present invention relates to a non-contact vibration suppressing device and a method of processing an object using the same, and more particularly, to a non-contact vibration suppressing device able to suppress vibrations using repelling force induced from ultrasonic vibrations and a method of processing an object using the same.

Description of Related Art

In an operation of processing an object (e.g. cutting, polishing, shaping, printing on, or coating the object), more particularly, in a thin sheet processing operation, the object vibrates due to a plurality of reasons, such as mechanical vibrations. In some cases, the object undesirably vibrates through resonance. Such vibrations of the object not only generate noise, but also become a factor lowering and degrading several types of processing precision. Such vibrations also cause adverse effects not only on the operation of processing the object, but also on the precision of the operations of examining, measuring, controlling, or transporting the object.

FIG. 1 and FIG. 2 schematically illustrate a mechanical vibration suppressing device of the related art.

In order to solve these problems, as illustrated in FIG. 1 and FIG. 2, vibrations were suppressed using mechanical rollers 211 and 212 in the related art. However, when the object is formed of a brittle material or a material sensitive to impurities or vulnerable to scratches on the surface, the object tends to be damaged by mechanical contact. Therefore, it is required for such materials to avoid mechanical contact.

FIG. 3 and FIG. 4 schematically illustrate a non-contact vibration suppressing device of the related art.

As illustrated in FIG. 3 and FIG. 4, there is provided a method of suppressing vibrations in a non-contact manner using a flow of fluid (high-pressure air) supplied from high-pressure air supplies 213 and 214 (Korean Patent Application Publication No. 10-2003-0053390, titled "DEVICE FOR SUPPRESSING VIBRATION OF STEEL SHEET IN NON-CONTACT MANNER IN CONTINUOUS STEEL MAKING LINE"). However, according to this method, it is critically difficult to uniformly adjust the height of the object using only the flow rate of the air and the force of maintaining the object in a non-contact state is very weak. Thus, the object tends to touch the device when the object is in an unstable state (e.g. trembling) (Korean Patent Application Publication No. 10-2011-0095191, titled "NON-CONTACT DANCER MECHANISM").

BRIEF SUMMARY OF THE INVENTION

Various aspects of the present invention provide a device for maintaining an object in a firm non-contact state and suppressing vibrations occurring from the operation of processing the object by applying uniform pressure onto the object without mechanical contact.

In an aspect of the present invention, provided is a non-contact vibration suppressing device that includes first and second ultrasonic vibrators spaced apart from and facing each other such that an object can be disposed therebetween. The first and second ultrasonic vibrators hold the object therebetween in a non-contact manner by generating ultrasonic vibrations and applying repelling force induced from the ultrasonic vibrations onto the object, thereby suppressing vibrations of the object.

In another aspect of the present invention, provided is a method of processing an object that includes the following operations of: suppressing vibrations of the object using the above-described non-contact vibration suppressing device; and processing the vibration-suppressed object.

According to the present invention as set forth above, it is possible to reliably carry out operations including processing, examination, measurement, control or transportation, by suppressing vibrations of an object while preventing the object from being damaged by mechanical contact.

DETAILED DESCRIPTION OF THE INVENTION

Figure 1:
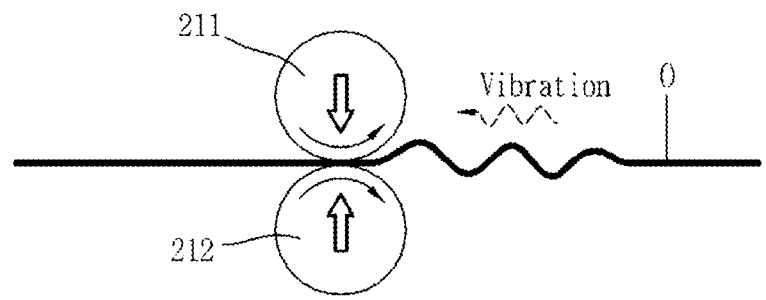
FIG. 1 and FIG. 2 schematically illustrate a mechanical vibration suppressing device of the related art.
Figure 2:
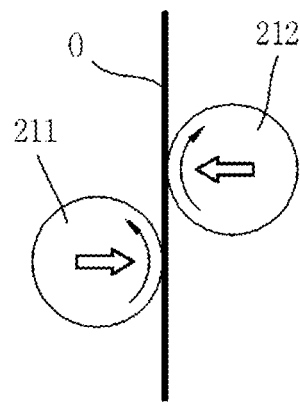
Figure 3:
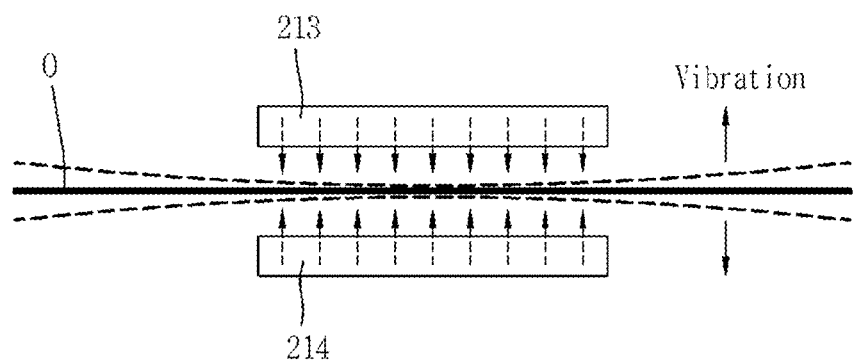
FIG. 3 and FIG. 4 schematically illustrate a non-contact vibration suppressing device of the related art.
Figure 4:
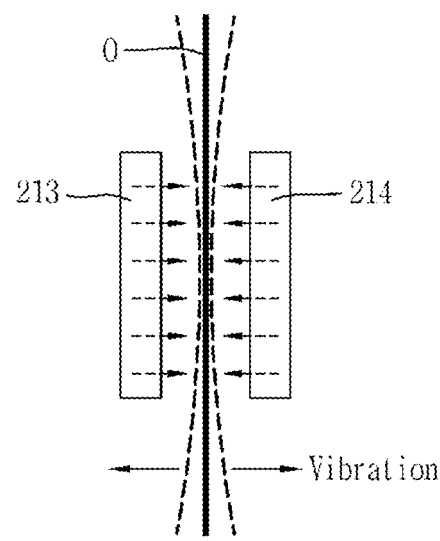

Reference will now be made in detail the present invention, embodiments of which are illustrated in the accompanying drawings and described below, so that a person skilled in the art to which the present invention relates could easily put the present invention into practice.

Throughout this document, reference should be made to the drawings, in which the same reference numerals and signs are used throughout the different drawings to designate the same or similar parts. In the following description of the present invention, detailed descriptions of known functions and parts incorporated herein will be omitted in the case that the subject matter of the present invention is rendered unclear.

The present invention relates to a non-contact vibration suppressing device able to suppress vibrations occurring from operations performed on an object including processing (e.g. cutting, polishing, shaping, printing, or coating), examination, measurement, control, or transportation. In particular, the non-contact vibration suppressing device can be used for suppressing vibrations in the operation of continuously processing a thin glass web. A thin glass web or a thin glass sheet produced therefrom can be used in a variety of fields, such as displays, electronic materials (e.g. photovoltaic cells, touch sensors, or wafers), construction and home appliances.

The object may be a thin material, a web or a sheet. The object may typically be a brittle material, for example, glass. However, the present invention is not limited thereto, but the object can be made of a variety of other materials.

Figure 5:
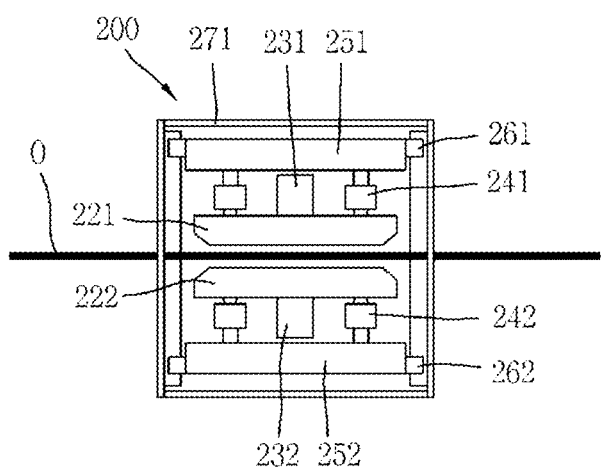
FIG. 5 to FIG. 7 schematically illustrate a non-contact vibration suppressing device according to a first exemplary embodiment of the present invention.
Figure 6:
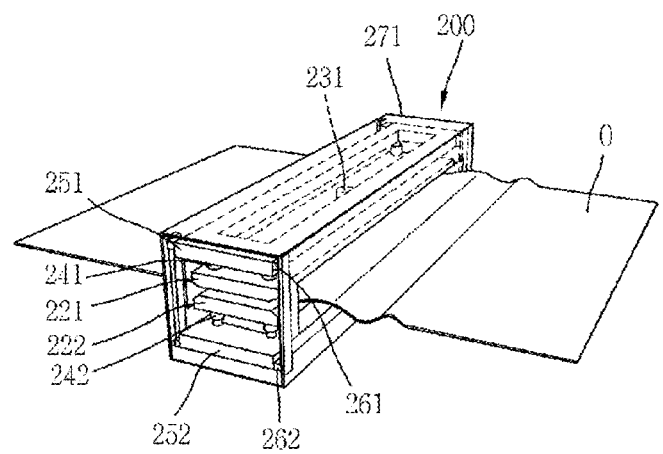
Figure 7:
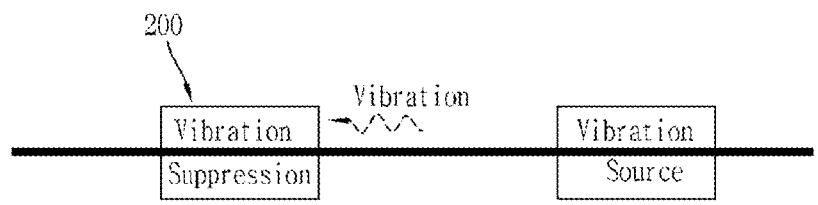

FIG. 5 to FIG. 7 schematically illustrate a non-contact vibration suppressing device 200 according to a first exemplary embodiment of the present invention.

As illustrated in FIG. 5 to FIG. 7, the non-contact vibration suppressing device 200 includes first and second ultrasonic vibrators 221 and 222 for holding a thin object O in a non-contact manner, ultrasonic wave generator 231 and 232 for generating ultrasonic waves, vibration absorbers 241 and 242 for absorbing vibrations of the ultrasonic vibrators 221 and 222, frames 251 and 252 fixing the ultrasonic vibrators 221 and 222, height adjustment units 261 and 262 for adjusting the distance between the ultrasonic vibrators 221 and 222, and a cover 271 for protecting inner parts of the device from the outside. The non-contact vibration suppressing device 200 further includes a control unit for controlling the vibrating conditions of the first ultrasonic vibrator 221 and the vibrating conditions of the second ultrasonic vibrator 222. The control unit electrically controls the vibrating conditions, thereby controlling repelling force applied to each surface of the object O.

Typically, the object O is transported during the operation, and the non-contact vibration suppressing device 200 is disposed on the path along which the object O is transported such that it suppresses vibrations of the object O that is being transported or vibrations of the object that is being processed in a stationary state.

The first ultrasonic vibrator 221 and the second ultrasonic vibrator 222 are spaced apart from and face each other such that the object O can be disposed therebetween. The ultrasonic vibrators 221 and 222 are in the shape of a flat plate or an arc, and can generate ultrasonic vibrations to apply holding force (pressure) onto the object O such that the object can be reliably held at a uniform height without being damaged by mechanical contact (Korean Patent Application Publication No. 10-2010-0057530).

The first ultrasonic vibrator 221 and the second ultrasonic vibrator 222 hold the object O therebetween in a non-contact manner by generating ultrasonic vibrations and applying the repelling force of a high-pressure air layer induced from the ultrasonic vibrations onto the object O, thereby suppressing vibrations of the object O. Specifically, the ultrasonic vibrators 221 and 222 generate force to reliably push the object O away from the opposite surfaces of the ultrasonic vibrators 221 and 222 by periodically compressing air using the ultrasonic vibrations, such that the object O does not come into contact with the ultrasonic vibrators 221 and 222. The ultrasonic vibrators 221 and 222 are arranged vertically (or laterally) to generate holding force to hold the object O in a non-contact manner.

According to the present invention, the air repelling force is maintained constant, thereby making it possible to respond to the problem of an unstable state (vibrating or trembling) that would otherwise occur in a non-contact vibration suppressing device of the related art.

For the precision of, for example, processing, examination, measurement, control and transportation, the non-contact vibration suppressing device 200 protects the object O from propagating vibrations.

As illustrated in FIG. 7, the non-contact vibration suppressing device 200 can suppress the propagation of vibrations in one direction.

Figure 8:
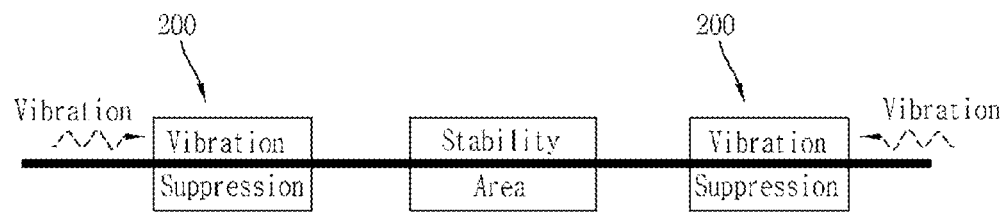
FIG. 8 and FIG. 9 schematically illustrate a non-contact vibration suppressing device according to a second exemplary embodiment of the present invention.
Figure 9:
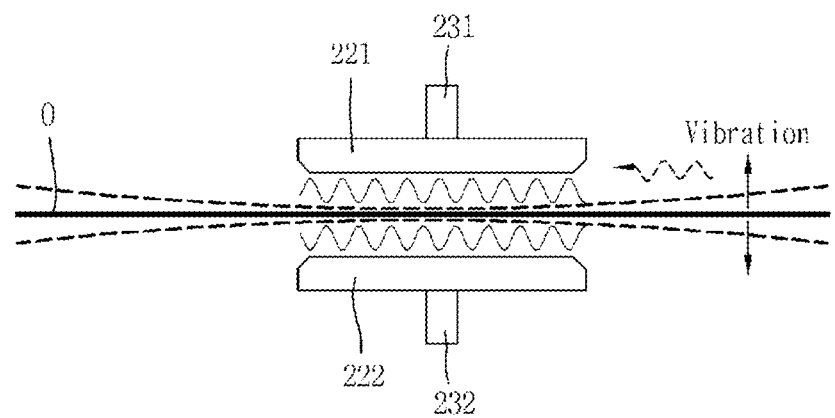

FIG. 8 and FIG. 9 schematically illustrate a non-contact vibration suppressing device 200 according to a second exemplary embodiment of the present invention.

As illustrated in FIG. 8 and FIG. 9, the non-contact vibration suppressing device 200 can protect an object O from vibrational disturbances.

Figure 10:
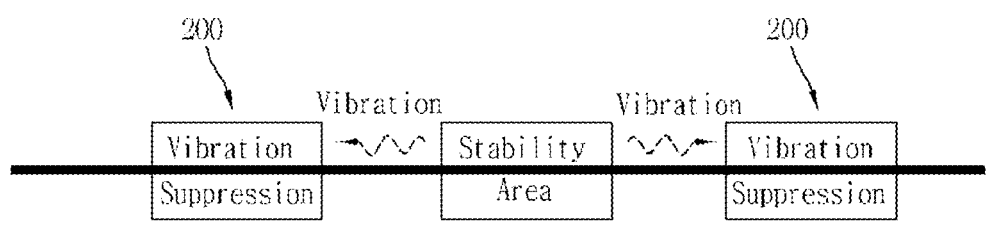
FIG. 10 schematically illustrates a non-contact vibration suppressing device according to a third exemplary embodiment of the present invention.

FIG. 10 schematically illustrates a non-contact vibration suppressing device 200 according to a third exemplary embodiment of the present invention.

As illustrated in FIG. 10, the non-contact vibration suppressing device 200 can suppress the propagation of vibrations in opposite directions.

Figure 11:
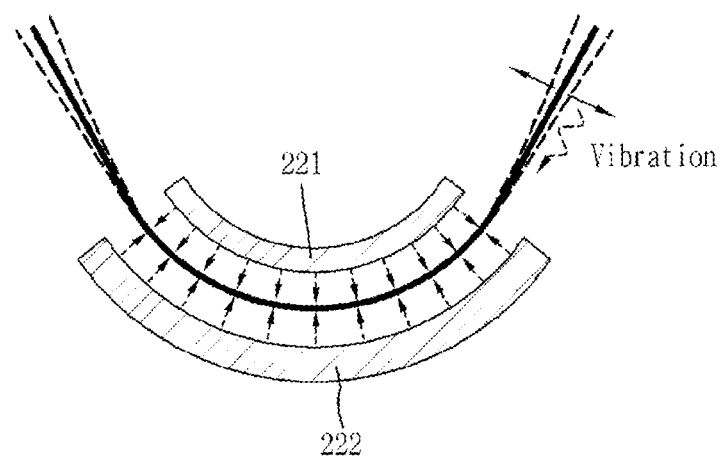
FIG. 11 schematically illustrates a non-contact vibration suppressing device according to a fourth exemplary embodiment of the present invention.

FIG. 11 schematically illustrates a non-contact vibration suppressing device 200 according to a fourth exemplary embodiment of the present invention.

The space extending between the first ultrasonic vibrator 221 and the second ultrasonic vibrator 222 may be straight along the length thereof, or as illustrated in FIG. 11, may be curved.

Figure 12:
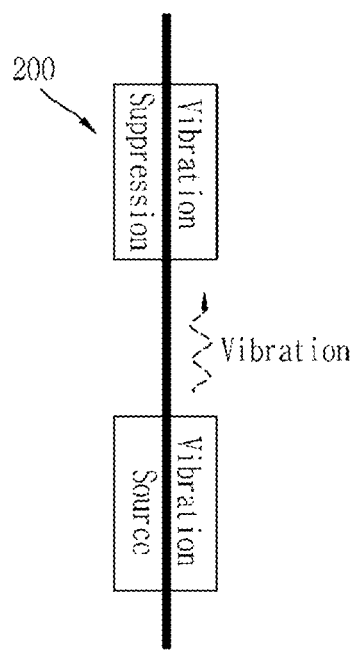
FIG. 12 and FIG. 13 schematically illustrate a non-contact vibration suppressing device according to a fifth exemplary embodiment of the present invention.
Figure 13:
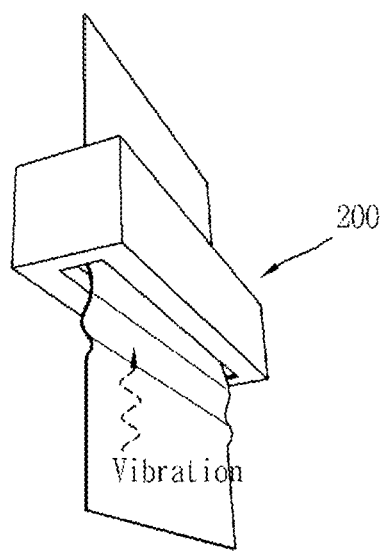

FIG. 12 and FIG. 13 schematically illustrate a non-contact vibration suppressing device 200 according to a fifth exemplary embodiment of the present invention.

As illustrated in FIG. 12 and FIG. 13, it is possible to suppress vibrations from being transferred from bottom to top in the operation of continuously transporting the thin object O in a vertical direction (in an upward or downward direction).

Figure 14:
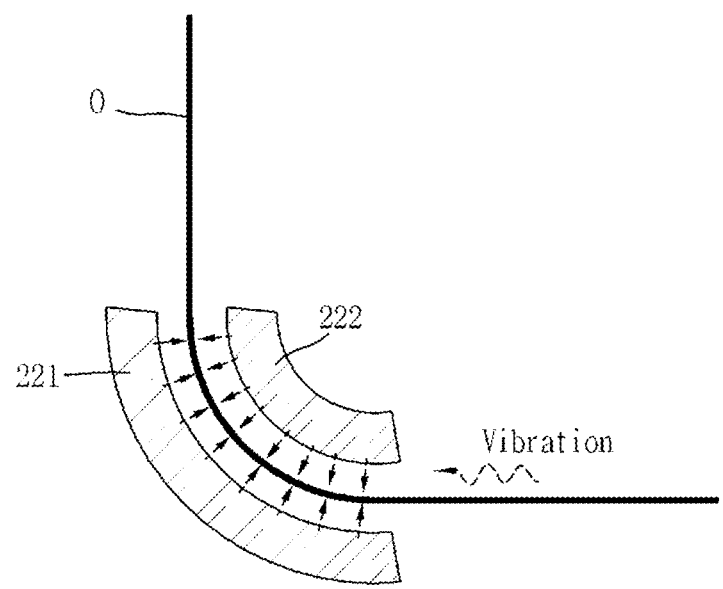
FIG. 14 schematically illustrates a non-contact vibration suppressing device according to a sixth exemplary embodiment of the present invention.

FIG. 14 schematically illustrates a non-contact vibration suppressing device 200 according to a sixth exemplary embodiment of the present invention.

As illustrated in FIG. 14, in a continuous web operation in which the transportation direction of the thin object O is changed, the non-contact vibration suppressing device 200 can guide the turning of the web and isolate vibrations by holding a curved section of the web.

Figure 15:
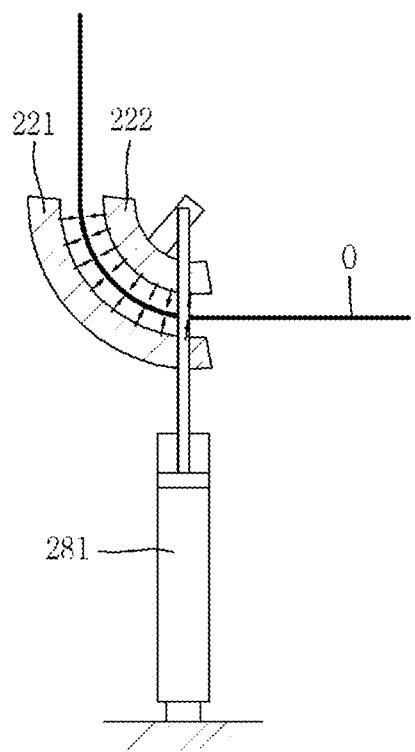
FIG. 15 schematically illustrates a non-contact vibration suppressing device according to a seventh exemplary embodiment of the present invention.

FIG. 15 schematically illustrates a non-contact vibration suppressing device 200 according to a seventh exemplary embodiment of the present invention.

As illustrated in FIG. 15, the non-contact vibration suppressing device 200 can use a cylinder 281 in order to move ultrasonic vibrators 221 and 222 upwardly or downwardly.

Figure 16:
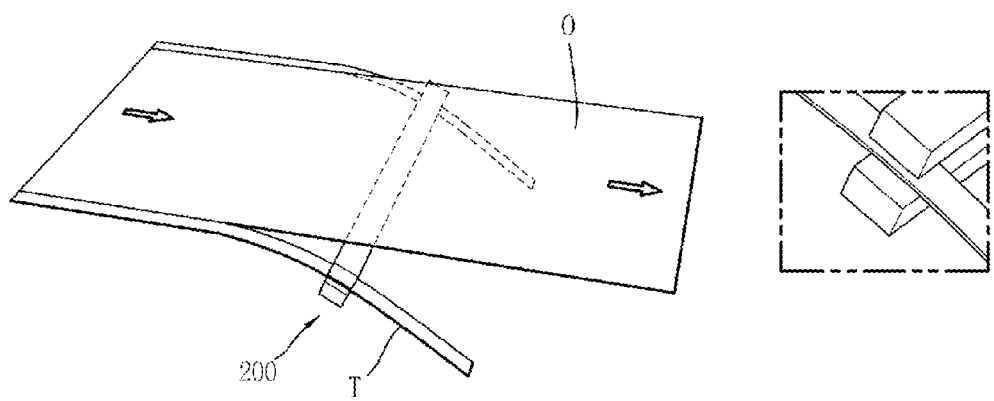
FIG. 16 and FIG. 17 schematically illustrate a non-contact vibration suppressing device according to an eighth exemplary embodiment of the present invention.
Figure 17:
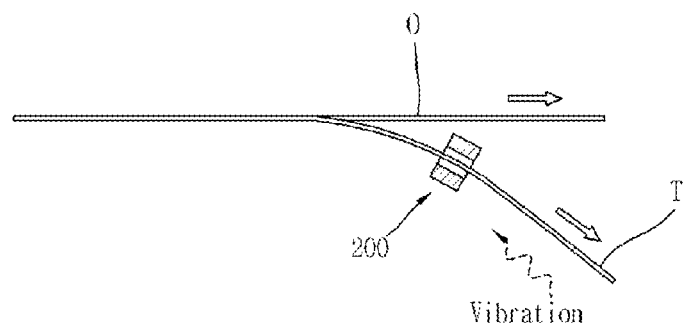

FIG. 16 and FIG. 17 schematically illustrate a non-contact vibration suppressing device 200 according to an eighth exemplary embodiment of the present invention.

As illustrated in FIG. 16 and FIG. 17, vibrations occur in the operations of cutting (trimming) and subsequently crushing edge portions of the web of the thin object O during continuous horizontal transportation, and the non-contact vibration suppressing device 200 can suppress the vibrations from propagating to the main body of the object O. For this, the non-contact vibration suppressing device 200 suppress the vibrations of the trimmed portions T by applying repelling force induced from ultrasonic vibrations to the trimmed portions T.

Figure 18:
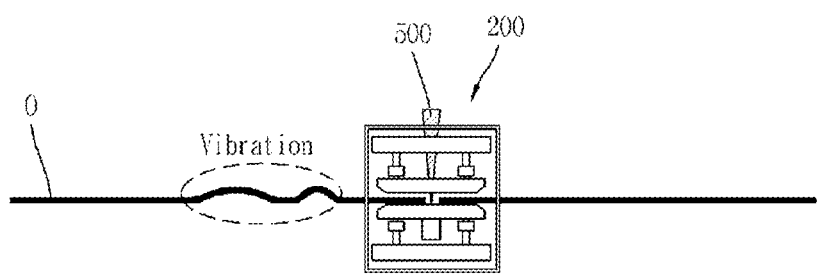
FIG. 18 schematically illustrates a non-contact vibration suppressing device according to a ninth exemplary embodiment of the present invention.

FIG. 18 schematically illustrates a non-contact vibration suppressing device 200 according to a ninth exemplary embodiment of the present invention.

As illustrated in FIG. 18, the non-contact vibration suppressing device 200 can be used in the operation of cutting the object O along the width using a cutting unit 500 in order to suppress vibrations of both adjacent portions of the object O that are lengthwise adjacent to a cut portion that is being cut, by applying repelling force induced from ultrasonic vibrations onto both the adjacent portions.

Figure 19:
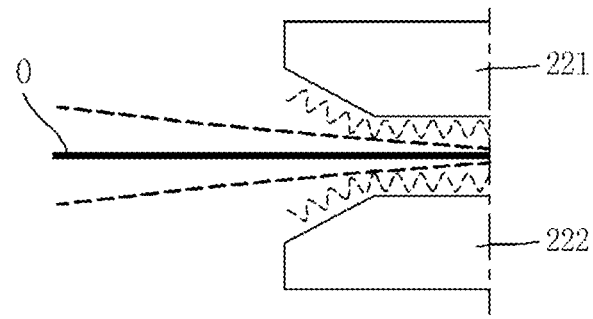
FIG. 19 illustrates examples of corner structures of ultrasonic vibrators.
Figure 19:
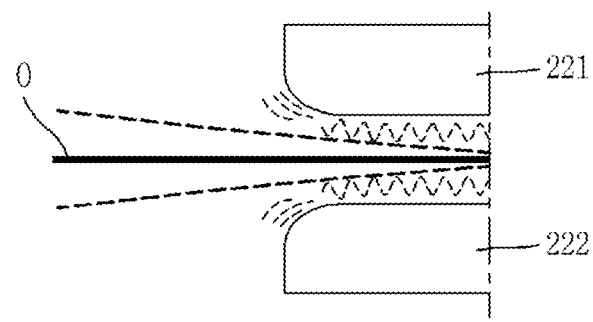

FIG. 19 illustrates examples of corner structures of ultrasonic vibrators 221 and 222.

The thin object O may collide into corners of the ultrasonic vibrators 221 and 222, there breaking or damaging itself. Accordingly, the corner portions of the ultrasonic vibrators 221 and 222 are chamfered at an incline or machined into a round shape such that the corner portions are farther away from the object O than the other part of the first and second ultrasonic vibrators in order to minimize the breakage or damage of the object O.

What is claimed is:

1. A non-contact vibration suppressing device comprising:
  a cover;
  first and second ultrasonic vibrators spaced apart from and facing each other such that an object is to be disposed therebetween, the first and second ultrasonic vibrators being disposed within the cover;
  first and second ultrasonic generators disposed within the cover and connected to the first and second ultrasonic vibrators respectively to generate ultrasonic waves;
  first and second vibration absorbers disposed within the cover and connected to the first and second ultrasonic vibrators respectively for absorbing vibrations of the first and second ultrasonic vibrators;
  first and second frames disposed within the cover, the first and second frames connected to the first and second ultrasonic vibrators respectively to secure the first and second ultrasonic vibrators to the non-contact vibration suppressing device, and
  first and second height adjustors disposed within the cover, the first and second height adjustors being connected to the first and second frames respectively to adjust a distance between the first and second ultrasonic vibrators;
  wherein the first and second ultrasonic vibrators hold the object therebetween in a non-contact manner by generating ultrasonic vibrations and applying repelling force induced from the ultrasonic vibrations onto the object, thereby suppressing vibrations of the object.

2. The non-contact vibration suppressing device according to claim 1, wherein the object comprises a thin web or a thin sheet.

3. The non-contact vibration suppressing device according to claim 1, wherein the object comprises glass.

4. The non-contact vibration suppressing device according to claim 1, further comprising a control unit controlling vibrating conditions of the first ultrasonic vibrator and the second ultrasonic vibrator.

5. The non-contact vibration suppressing device according to claim 1, wherein
  the object is transported, and
  the non-contact vibration suppressing device is disposed on a path along which the object is transported, and suppresses vibrations of the object that is being transported or vibrations of the object that is being processed in a stationary state.

6. The non-contact vibration suppressing device according to claim 1, wherein a space between the first and second ultrasonic vibrators is straight or curved along a length thereof.

7. The non-contact vibration suppressing device according to claim 1, wherein corner portions of the first and second ultrasonic vibrators have such a shape that the corner portions are farther away from the object than the other part of the first and second ultrasonic vibrators.

8. A method of processing an object comprising:
  suppressing vibrations of the object using the non-contact vibration suppressing device as claimed in claim 1; and
  processing the vibration-suppressed object.

9. The method according to claim 8, wherein processing the object comprises at least one selected from the group consisting of cutting, polishing, shaping, printing on, and coating the object.

10. The method according to claim 9, wherein
  processing the object comprises trimming the object along a length thereof, and
  suppressing the vibrations comprises suppressing vibrations of a portion trimmed away from the object by applying repelling force induced from ultrasonic vibrations onto the trimmed portion.

11. The method according to claim 9, wherein
  processing the object comprises cutting the object, and
  suppressing the vibrations comprises suppressing vibrations of both adjacent portions of the object that are lengthwise adjacent to a cut portion that is being cut, by applying repelling force induced from ultrasonic vibrations onto both the adjacent portions.

* * * * *